P. P. Lane,

Self-Lubricating Journal Box.

No. 3,623. Reissued Aug. 31. 1869.

Witnesses;
James H. Sleyman
Charles R. Pulle.

Inventor;
P. P. Lane
By Murphy Bro
Att.

UNITED STATES PATENT OFFICE.

PHILANDER P. LANE, OF CINCINNATI, OHIO, ASSIGNOR TO LANE & BODLEY, OF SAME PLACE.

IMPROVEMENT IN SELF-LUBRICATING JOURNAL-BOXES.

Specification forming part of Letters Patent No. 71,313, dated November 26, 1867; Reissue No. 3,623, dated August 31, 1869.

*To all whom it may concern:*

Be it known that I, PHILANDER P. LANE, of Cincinnati, Hamilton county, Ohio, have invented a new and useful Self-Lubricating Journal-Box; and I do hereby declare the following to be a full, clear, and exact description thereof, reference being had to the accompanying drawings, making part of this specification.

This invention relates to a journal-box so constructed as, during the rotation of the shaft, to afford a constant supply of lubricating-fluid without the use of wicks, capillary attraction, or of an elevated reservoir.

Figure 1:
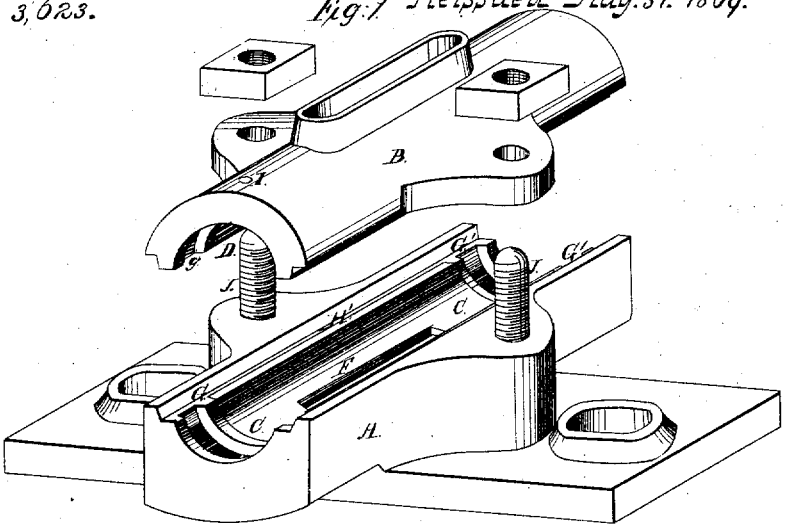
Figure 2:
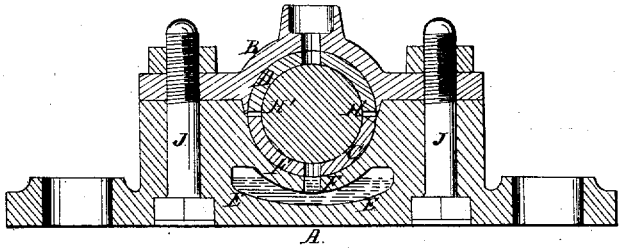
Figure 3:
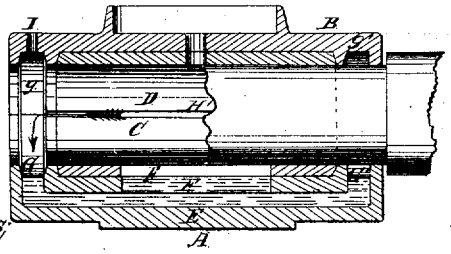

In the accompanying drawings, Figure 1 is a perspective view of the parts detached. Fig. 2 is a transverse section of the box. Fig. 3 is a longitudinal section thereof.

A is the lower member or step, and B the upper member or cap, of a journal-box.

C and D represent the "Babbitt" lining of cap and step, respectively.

The step A contains at its lower portion a chamber, E, whose upper part is preferably lower than the lower part of the journal.

F is a narrow longitudinal slot or tube, which extends from near the bottom of the chamber E through the bottom of the bearing. The lower orifice of the slot or tube F should be within as short a distance of the bottom of the chamber E as may be consistent with safe and perfect workmanship, together with a proper allowance of space for the passage of the lubricating-fluid under and into the said slot or tube, so that the entire body of oil or other lubricating-fluid contained within the chamber E may be exhausted before the admission of air to the said slot can impair the vacuum formed in it, and thus, for the time being, destroy the proper action of the box.

G *g* G′ *g′* are ducts near the ends of the box, which ducts communicate with the ledges or channels H H′ at the meeting of the step and cap.

I is an orifice in the cap through which oil or other lubricating-fluid may be supplied when desired.

J J represent the customary screw-bolts for fastening the cap.

The operation of this box is as follows: The reservoir or chamber E being supplied with lubricating-fluid, the shaft is placed in the box and the cap screwed in place. The shaft, being then set in motion, creates by its rotation a vacuum within the slot or tube F, when the fluid contained within the chamber E, being exposed to the action of the atmosphere from without through the medium of the channels or ducts G *g* G′ *g′*, naturally rises within the chamber E to supply the vacuum thus formed, the result of which action is a constant supply of the lubricating-fluid to the journals so long as any fluid remains in the chamber E and above the bottom of the slot or chamber F. The overplus of lubricating-fluid returns along the ledges H H′ and is caught by the ducts G *g* G′ *g′* and is returned to the reservoir E.

This plan of journal-box avoids the expense and annoyance of wicks with their liabilities of becoming clogged by the accumulation of feculences, or scorched by an overheated journal, and it also avoids the dirt and waste which constantly attend the overflow of those reservoirs which are wholly or partially above the bottom of the journal.

I claim herein as new and of my invention—

1. The oil-chamber E, placed below the bottom of the journal, and communicating therewith by one or more apertures F in a protuberance projecting downward into the said oil-chamber, substantially as represented.

2. The self-lubricating journal-box having the oil-chamber E below the bottom of the journal, and communicating with the journal, at or near its mid-length by one or more apertures F, and at or near the ends thereof by ducts G *g* G′ *g′*, to which the overplus of oil is conveyed by channels H H′, substantially as set forth.

In testimony of which invention I hereunto set my hand.

PHILANDER P. LANE.

Witnesses:

GEO. H. KNIGHT,

JAMES H. LAYMAN.